US011099731B1

(12) United States Patent
Everette et al.

(10) Patent No.: US 11,099,731 B1
(45) Date of Patent: Aug. 24, 2021

(54) TECHNIQUES FOR CONTENT MANAGEMENT USING A GESTURE SENSITIVE ELEMENT

(71) Applicant: Amazon Technologies, Inc., Reno, NV (US)

(72) Inventors: Neil Wade Everette, Austin, TX (US); Traci Wei-Fien Tsai Gadow, Belmont, CA (US); Marisa Cathleen Gallagher, San Francisco, CA (US); Aaron Koop, San Francisco, CA (US); Kevin Moran, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 279 days.

(21) Appl. No.: 15/226,752

(22) Filed: Aug. 2, 2016

(51) Int. Cl.
*G06F 3/048* (2013.01)
*G06F 3/0488* (2013.01)
*G06F 3/0482* (2013.01)
*G06F 3/0484* (2013.01)
*G06F 3/0481* (2013.01)

(52) U.S. Cl.
CPC .......... *G06F 3/0488* (2013.01); *G06F 3/0482* (2013.01); *G06F 3/04817* (2013.01); *G06F 3/04847* (2013.01)

(58) Field of Classification Search
CPC .. G06F 3/0488; G06F 3/0486; G06F 3/04817; G06F 3/0482; G06F 3/04847
See application file for complete search history.

(56) References Cited

U.S. PATENT DOCUMENTS

| | | | | |
|---|---|---|---|---|
| 2008/0297483 | A1* | 12/2008 | Kim | G06F 3/04817 345/173 |
| 2010/0269040 | A1* | 10/2010 | Lee | G06F 3/04817 715/702 |
| 2011/0267280 | A1* | 11/2011 | De Mers | G06F 3/04886 345/173 |
| 2012/0032979 | A1* | 2/2012 | Blow | G06F 1/1626 345/647 |
| 2012/0050185 | A1* | 3/2012 | Davydov | G06F 3/04883 345/173 |
| 2012/0311498 | A1* | 12/2012 | Kluttz | G06F 3/0481 715/825 |
| 2013/0187866 | A1* | 7/2013 | Kim | G06F 3/0488 345/173 |
| 2013/0212487 | A1* | 8/2013 | Cote | G06F 9/451 715/745 |
| 2013/0219299 | A1* | 8/2013 | Yerli | G06F 3/0481 715/753 |

(Continued)

*Primary Examiner* — Alex Olshannikov
(74) *Attorney, Agent, or Firm* — Hogan Lovells US LLP

(57) ABSTRACT

Embodiments of the present invention provide a graphical user interface (GUI) that includes a gesture sensitive element. The gesture sensitive element can be used to display or hide different amounts of GUI control elements, reducing complexity until it is requested and increasing screen area available for content. By including a gesture sensitive element that can be used to invoke various actions and to provide a progressive level of controls, the number and complexity of elements shown in a GUI can be reduced, improving usability and reducing the number of interactions required to perform a desired action which reduces the processing required by the computer device.

20 Claims, 14 Drawing Sheets

(56) References Cited

U.S. PATENT DOCUMENTS

| | | | |
|---|---|---|---|
| 2014/0096092 A1* | 4/2014 | Johnson | G06F 3/0481 |
| | | | 715/863 |
| 2014/0223328 A1* | 8/2014 | Thomas | G06F 3/14 |
| | | | 715/747 |
| 2014/0237338 A1* | 8/2014 | Hu | G06F 40/134 |
| | | | 715/207 |
| 2014/0253526 A1* | 9/2014 | Park | H04W 12/02 |
| | | | 345/204 |
| 2015/0012940 A1* | 1/2015 | Jung | G11B 27/327 |
| | | | 725/37 |
| 2015/0100982 A1* | 4/2015 | Sirpal | H04N 21/4126 |
| | | | 725/37 |
| 2015/0160779 A1* | 6/2015 | Huang | G06F 3/0488 |
| | | | 345/174 |
| 2015/0331572 A1* | 11/2015 | Mischke | G06F 17/30053 |
| | | | 715/769 |
| 2015/0370461 A1* | 12/2015 | Zhang | G06F 3/04817 |
| | | | 715/716 |
| 2016/0103594 A1* | 4/2016 | Greenberg | G06F 3/04847 |
| | | | 715/255 |
| 2017/0277399 A1* | 9/2017 | Moon | G06F 3/0488 |
| 2017/0293691 A1* | 10/2017 | Zitouni | G06N 99/005 |

* cited by examiner

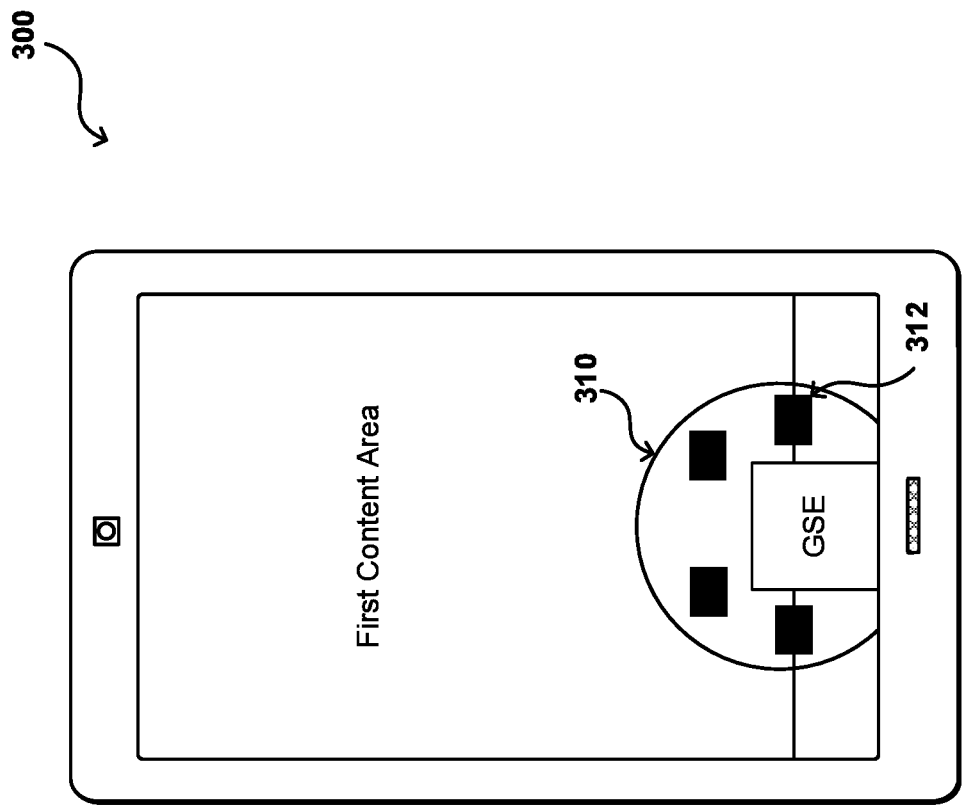
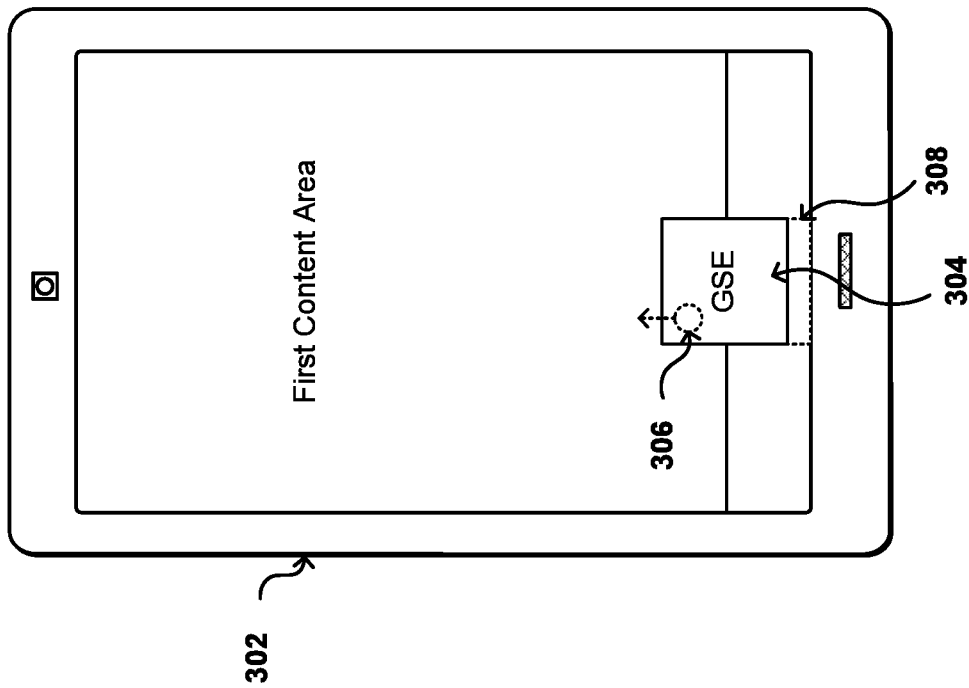
FIG. 3A
FIG. 3B

TECHNIQUES FOR CONTENT MANAGEMENT USING A GESTURE SENSITIVE ELEMENT

BACKGROUND

Conventional music and multimedia applications (e.g., apps) enable users to perform an action on a background task (e.g., playing, pausing, or skipping a playing song) while performing another foreground task. Traditionally, these actions have been initiated by the user through the use of statically placed graphical user interface (GUI) buttons. These GUI buttons when touched initiate a function related to the current music or multimedia being displayed. A typical GUI screen can display a limited number of icons, buttons, or other elements. This limit is based on the limited screen area available, and to reduce complexity. However, user devices and apps support more types and sources of content (e.g., purchased music, streaming playlists, stations, etc.), leading to more buttons required to access the content. This results in more screen area being dedicated to buttons, increasing complexity and reducing the area available to the content itself.

BRIEF DESCRIPTION OF THE DRAWINGS

Various embodiments in accordance with the present disclosure will be described with reference to the drawings, in which:

FIGS. 3A and 3B illustrate an example of control using the gesture sensitive element, in accordance with various embodiments;

DETAILED DESCRIPTION

Systems and methods in accordance with various embodiments of the present disclosure overcome one or more of the above-referenced and other deficiencies in conventional approaches for content management in an electronic environment. In particular, various embodiments provide a graphical user interface (GUI) that includes a gesture sensitive element. The gesture sensitive element can be used to display or hide different amounts of GUI control elements, reducing complexity until it is requested and increasing screen area available for content. For example, a given selection of music content items may be associated with various actions: play or pause, skip to next, skip to previous, fast forward, fast rewind, repeat, loop, skip to next station, skip to previous station, or cause to be played on an external device (e.g., a television, wirelessly connected speaker or receiver, or other device). These options, along with other application level controls (search, open voice controls, navigation to another page, etc.) lead to a greater area of the screen being occupied by control elements, providing less available area for the display of content items. As the number of control elements increases, the complexity of the application also increases, resulting in a poorer user experience. For example, under Hick's law, a user's response time increases as the number of available options increases. Similarly, under Fitts' law, as GUI elements get smaller and the time required to select the elements increase. By including a gesture sensitive element that can be used to invoke various actions and to provide a progressive level of controls, the number and complexity of elements shown in a GUI can be reduced, improving usability and reducing the number of interactions required to perform a desired action which reduces the processing required by the computer device.

Embodiments of the present invention address the growing number of UI controls to perform tasks within a limited area of the user interface. An adaptable, multiple functional user interface element can perform a variety of functions based on gesture based inputs (tap, press, press with pressure, press and hold, drag, drag and hold, etc.). This gesture sensitive element can be interacted with to initiate various functions, including actions performed on content items as well as causing additional control elements to be displayed on demand. This solution is scalable across multiple devices (phones, tablets, platforms, and other devices) and can expose control panels and/or overlays having more complex control elements based on the gesture based inputs.

Various other functions and advantages are described and suggested below as may be provided in accordance with the various embodiments.

Figure 1:
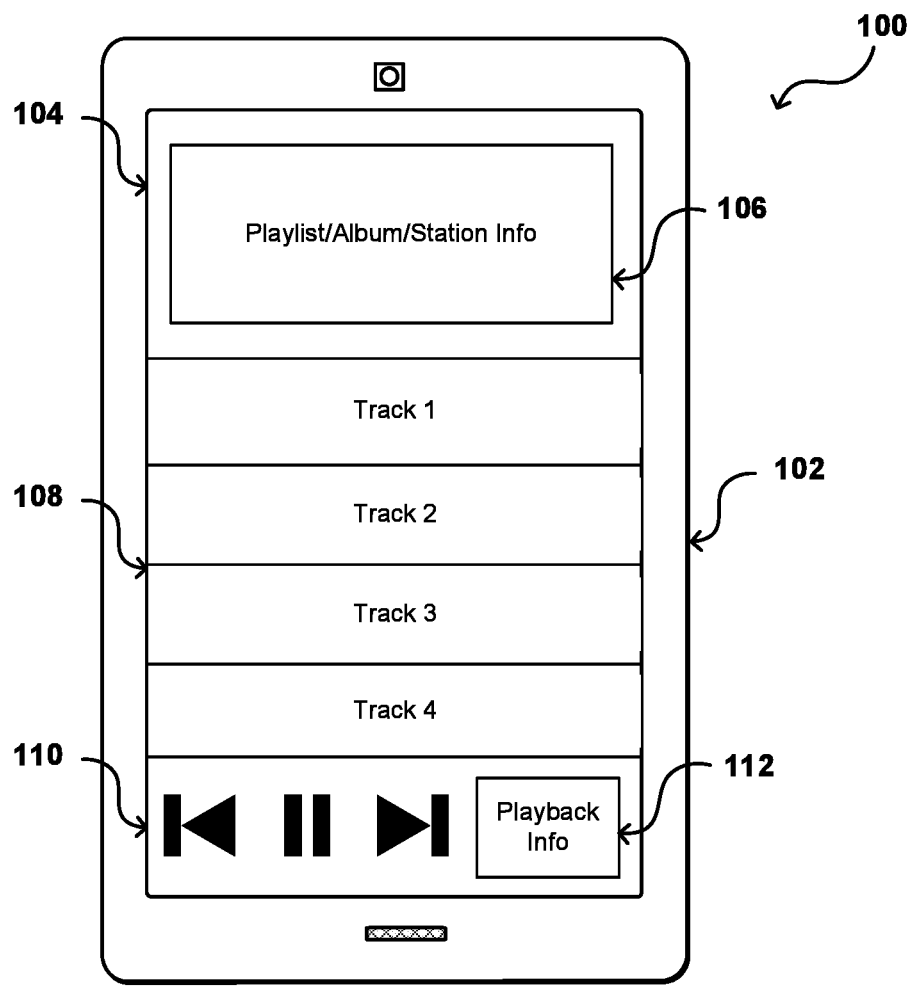
FIG. 1 illustrates an example graphical user interface.

FIG. 1 illustrates an example 100 graphical user interface. In this example, a user device 102 can include a music app. Although embodiments are discussed herein generally with respect to music apps, embodiments may be used with any content management application, including images, videos, electronic marketplace items, and other content items. User device 102 may include a touchscreen 104 or other user interface device or devices configured to display content to a user and receive inputs corresponding to displayed content items. As shown in FIG. 1, a number of selectable icons and control elements may be displayed. For example, element 106 may include playlist, album, station information, or other information corresponding to a set of content items. Other content items included in this set may be shown at panel 108. Each content item (e.g., tracks 1-4) shown in panel 108 may be selectable (e.g., by tapping, clicking, or otherwise selecting the element) which may cause the selected element to be displayed and/or played (e.g., using speakers integrated into user device 102, or wired or wirelessly connected speakers, headphones, or other audio playback devices). Control panel 110 can include multiple controls related to the current content item, which may be indicated at playback information panel 112 (e.g., track name/number, artist name, etc.).

As discussed above, in a music app such as that shown in FIG. 1, the controls included in control panel 110 may include play or pause, skip to next, skip to previous, fast forward, fast rewind, repeat, loop, skip to next station, skip to previous station, or cause to be played on an external device (e.g., a television, wirelessly connected speaker or receiver, or other device). This requires the portion of screen 104 allocated to control panel 110 to increase, at the expense of content that could be displayed at 106 and 108. As panels become more crowded with icons, more panels are incorporated into these apps, leading to an even more complex user experience, where users must navigate across multiple complex control panels to identify the desired icon. Additionally, the large number of controls can make usability slow and difficult, as the user must locate and select small, densely packed, control elements. Embodiments discussed below address these shortcomings using a gesture sensitive element.

Figure 2:
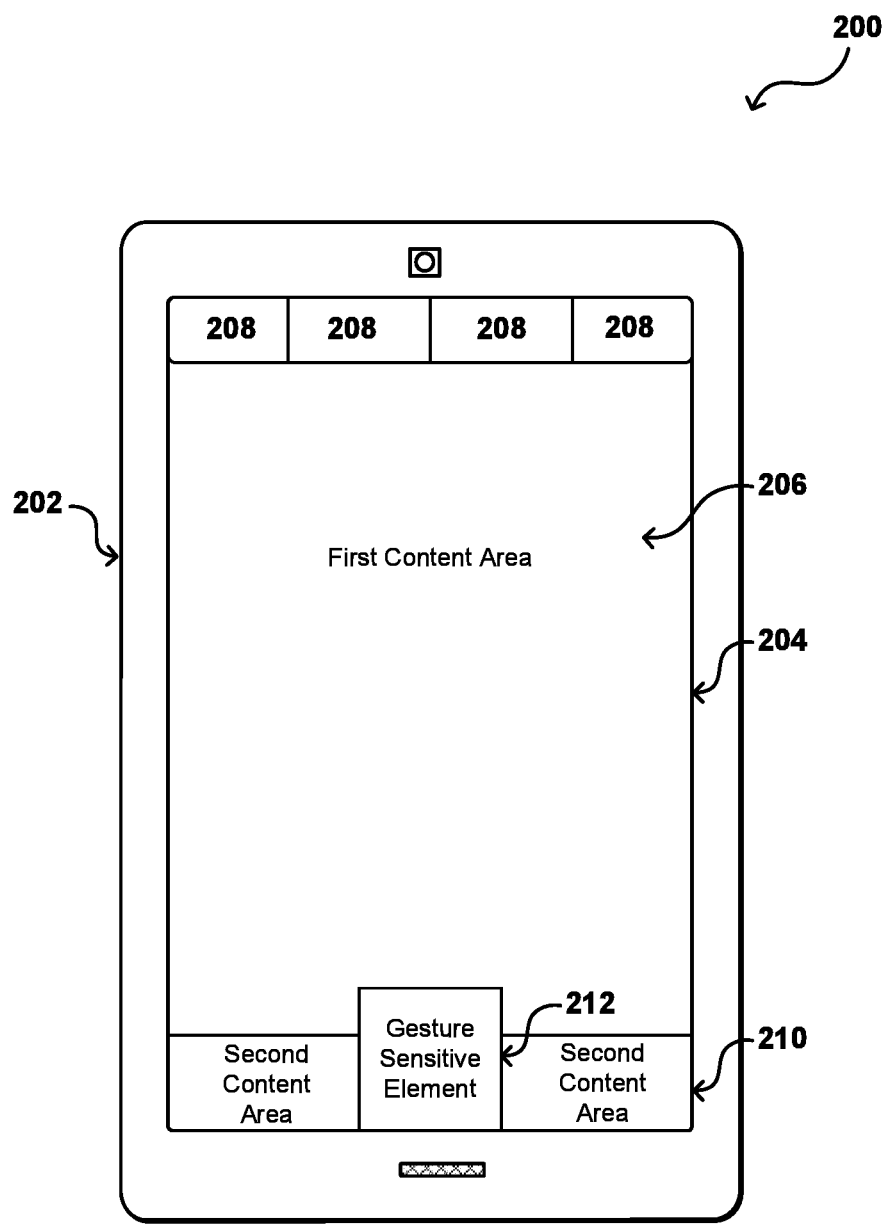
FIG. 2 illustrates an example of a graphical user interface including a gesture sensitive element, in accordance with various embodiments.

FIG. 2 illustrates an example of a graphical user interface 200 including a gesture sensitive element, in accordance with various embodiments. As shown in FIG. 2, graphical user interfaces in accordance with embodiments of the present invention enable a greater portion of screen area to be dedicated to content which may be managed using a simplified control scheme. User device 202 can include a mobile device, such as a smartphone, tablet computer, electronic book reader, or other mobile device, having a screen 204. Screen 204 can display a graphical user interface and can be configured to receive inputs from a user (e.g., through a touch screen interface). In some embodiments, user device 202 can receive input from a user using a pointing device, such as a mouse or track pad, an eye gaze monitor that tracks the position and/or focus of a user's eyes, or other input device.

As shown in FIG. 2, the graphical user interface can include a number of elements, including a first content area 206, which may include multiple tabbed panels 208, a second content area 210, and a gesture sensitive element 212. First content area 206 can display content related to various content items a user is managing. For example, the first content area may include music content items being browsed by the user (including songs, albums, artists, and other music content items), image or video content items (including photographs, stored locally or remotely, user image or video catalogs, third party images or video catalogs, etc.). A user can interact with content items in the first content area through a touchscreen interface, such as by tapping to select items, swiping to navigate between tabs 208 and to scroll through the first content area 206. In some embodiments, as a user navigates the first content area, the tabs 208 may be hidden to increase the area available to display content.

While the user is interacting with various content items in first content area 206, information related to a current content item (e.g., music track being played or other content item being consumed) can be shown in second content area 210. The second content area 210 can include control icons which, when selected, cause favorite content items to be displayed, cause the first content area 206 to return to a home screen or other designated screen, cause a settings menu to be displayed, and other actions. Accordingly, unlike convention graphical user interfaces, the embodiment shown in FIG. 2 enables content to be displayed over most of the screen, reducing complexity.

As discussed above, a large number of controls, occupying a large portion of the screen, is needed by the user to navigate content in convention GUIs. As shown in FIG. 2, a gesture sensitive element 212 can embody a large number of potential controls in a single GUI element. In some embodiments, when a user selects gesture sensitive element 212 the input can be analyzed to determine a gesture associated with the input. In various embodiments, when an input is received by the touchscreen, it can determine a location associated with the input. If the location is within an area of the screen associated with the gesture sensitive element, then it can be determined whether the input includes a gesture. Based on the input gesture, various actions can be performed, such as content control actions, displaying additional control panels or overlays, and other actions. As discussed herein, gestures may include tap, drag, tap and hold, swipe and hold, hold and tap, hold and swipe, and various other gestures. For example, when navigating music content items, tapping the gesture sensitive element 212 can cause the media to pause or resume playing. Various embodiments corresponding to different gestures are discussed below.

FIGS. 3A and 3B illustrate an example 300 of managing controls using the gesture sensitive element, in accordance with various embodiments. As shown in FIG. 3A, user device 302 can include a GUI having a gesture sensitive element 304. As discussed above, gesture sensitive element 304 can perform one or more actions based on one or more gesture-based inputs. As shown in FIG. 3A, a user can tap or tap and drag 306 gesture sensitive element 304. In some embodiments, as the user taps and drags 306 the gesture sensitive element, the GUI can cause the gesture sensitive element 304 to move 308 upward to follow the direction of the drag.

As shown in FIG. 3B, the gesture sensitive element 304 can return to the same position after the user releases the drag. In some embodiments, when the gesture sensitive element 304 is tapped or dragged a first distance, an additional control area 310 including additional controls 312 can be displayed. Controls 312 can be specific to the type of media being viewed. For example, in a music app, the controls 312 can include track forward and reverse, repeat, randomize, or other playback related controls. In some embodiments, a close gesture can be detected and cause the control area 310 to be hidden. For example, the close gesture can be the same as the open gesture (tap or tap and drag), the reverse of the open gesture (e.g., drag down), or other gesture.

Figure 4C:
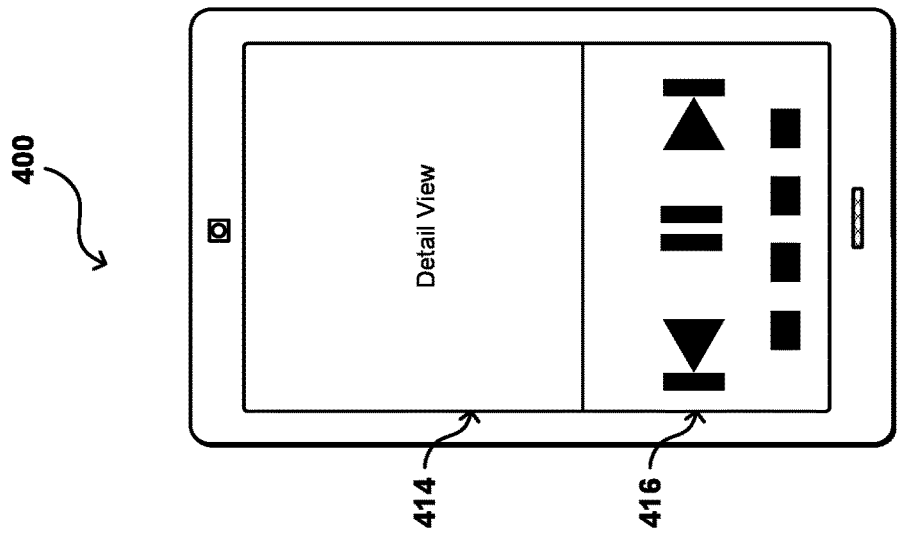
FIGS. 4A, 4B, and 4C illustrate an example navigating a graphical user interface using the gesture sensitive element, in accordance with various embodiments.
Figure 4B:
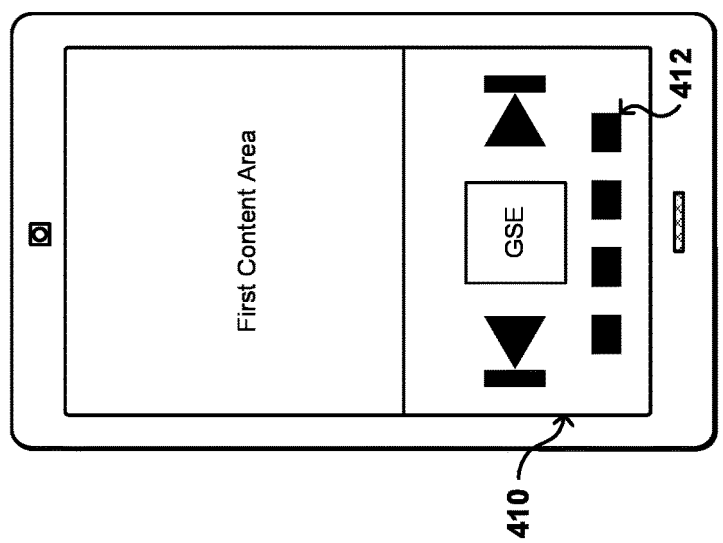
Figure 4A:
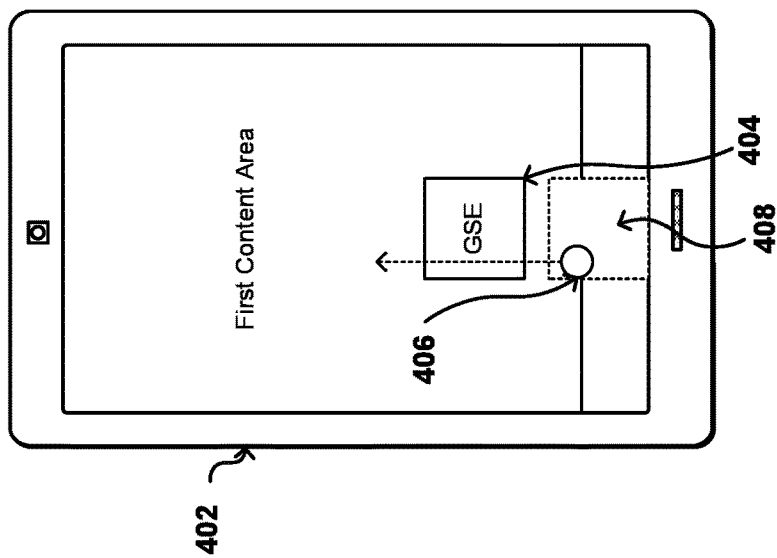

FIGS. 4A, 4B, and 4C illustrate an example 400 navigating a graphical user interface using the gesture sensitive element, in accordance with various embodiments. As shown in FIG. 4A, user device 402 can include a GUI having a gesture sensitive element 404. Similar to the embodiment shown in FIG. 3A, a user can tap and drag 406 gesture sensitive element 408 a second distance, longer than that described above with respect to FIG. 3A. Based on the longer drag distance, as shown in FIG. 4B, a control panel 410 can be displayed. Control panel 410 can include more GUI controls 412 than described above with respect to FIG. 3B. For example, in the music app example shown in FIGS. 4A-4C, the additional controls can include track forward and reverse, repeat, randomize, or other playback related controls, along with additional playback details such as a track length, current position, lyrics, or other information. In some embodiments, gesture sensitive element 404 can be included in control panel 410. The user can cause control panel 410 to be hidden with a close gesture which may include a tap and drag down, or other close gesture. Although the area available to the first content area is reduced in FIG. 4B, a reduced amount of the same content can continue to be displayed as shown in FIG. 4A. For example, if a track list is displayed in FIG. 4A, the same track list may be shown in FIG. 4B, though fewer tracks are shown in the reduced area.

As shown in FIG. 4C, if a tap and drag gesture covering a third distance, longer than the drags described above with respect to FIG. 3A, 3B, 4A, or 4B, can cause a full screen display 416 to be displayed. For example, a detail view 414 associated with the current content item can be displayed. For example, an album associated with the current track may be displayed in detail view 414. As such, depending on the length of the detected gesture in the Y direction, different control panels can be displayed, varying from the overlay shown in FIG. 3B to the detail view of FIG. 4C. This enables complex controls to be displayed when requested, and simplified controls to be displayed otherwise.

Figure 5C:
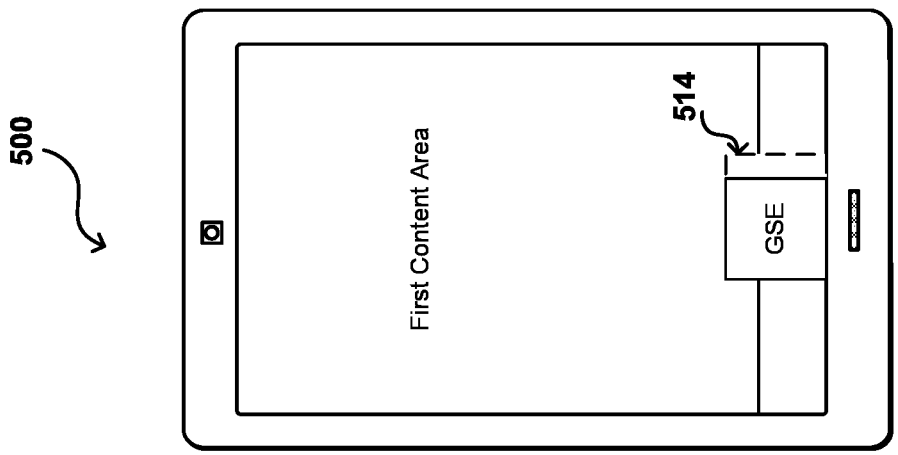
FIGS. 5A, 5B, and 5C illustrate an example of managing content using the gesture sensitive element, in accordance with various embodiments.
Figure 5B:
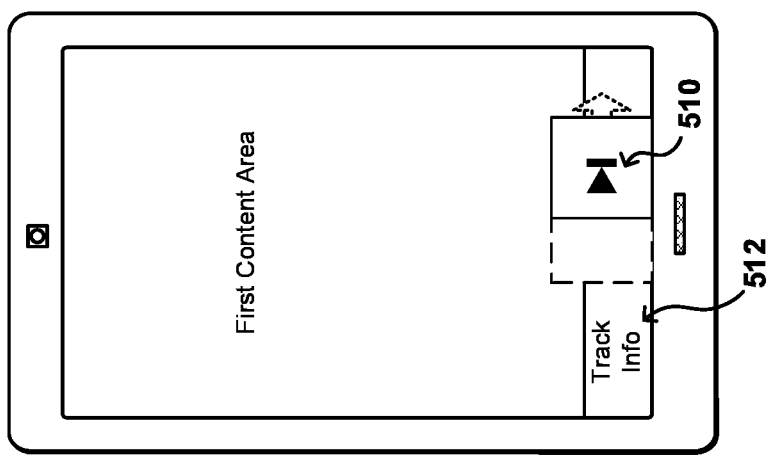
Figure 5A:
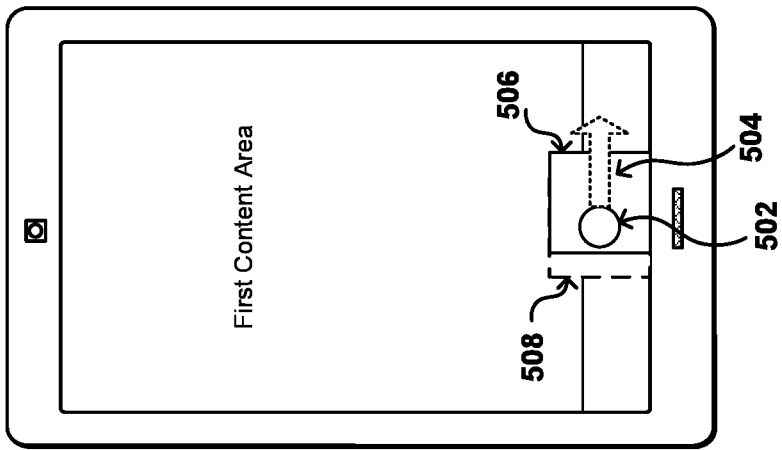

FIGS. 5A, 5B, and 5C illustrate an example 500 of managing content using the gesture sensitive element, in accordance with various embodiments. As shown in FIG. 5A, a user can tap 502 and drag 504 gesture sensitive element 506. The tap and drag gesture shown in this example is generally directed in the X direction and, when detected, the gesture sensitive element 506 can be shown to move 508 in the direction of gesture. As shown in FIG. 5B, as the gesture sensitive element 506 is dragged, it can be caused to display an icon 510 corresponding to an action associated with the gesture. For example, a tap and drag gesture may be associated with a track skip action. A tap and drag to the right may invoke track forward and a drag and swipe to the left may invoke track reverse. In some embodiments, track info 512 or other action related information can be displayed in the second content area. For example, a title and/or artist associated with the next track can be displayed at 512. When the user releases the drag portion of the gesture, as shown in FIG. 5C, the gesture sensitive element 506 can return 514 to the original location and the action can be performed. In some embodiments, the motion of the gesture sensitive element can be based on the gesture. For example, a fast tap and drag may cause the gesture sensitive element to quickly move and return, while a slow tap and drag may cause the gesture sensitive element to move slowly during the drag and return quickly upon release. A physics engine may be utilized to generate movement effects based on particular motions and movement characteristics (e.g., direction, speed, time held, etc.) of the gesture.

Figure 6C:
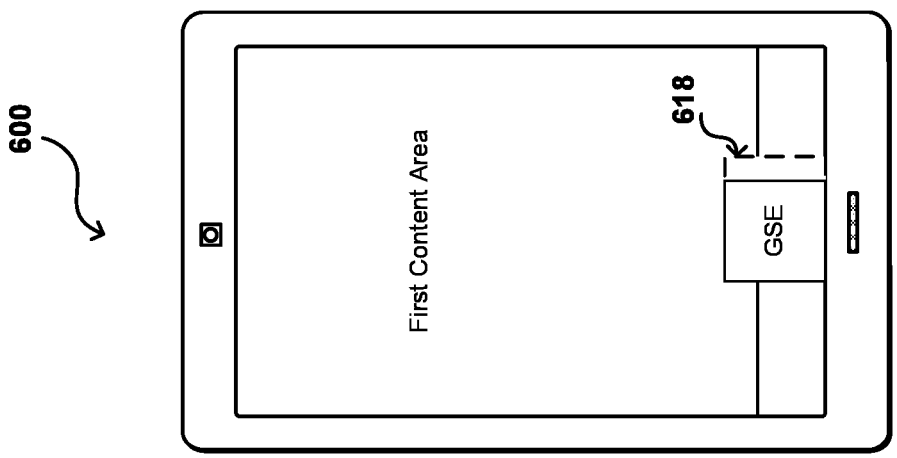
FIGS. 6A, 6B, and 6C illustrate an example of navigating content using the gesture sensitive element, in accordance with various embodiments.
Figure 6B:
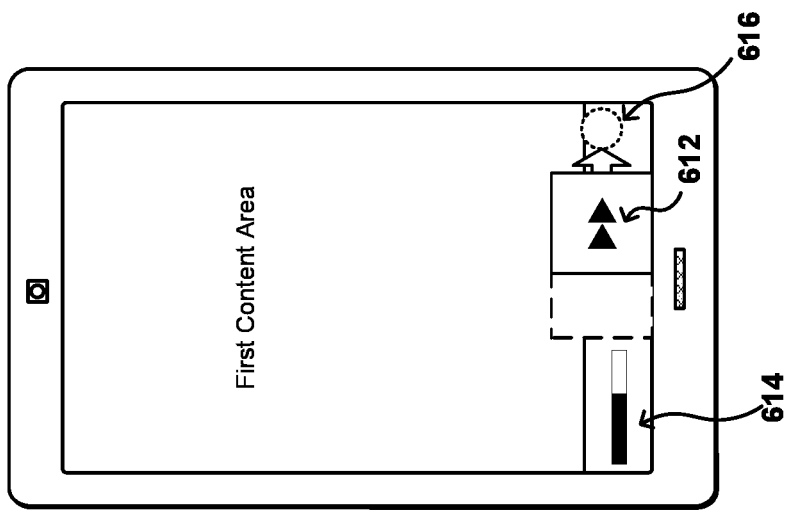
Figure 6A:
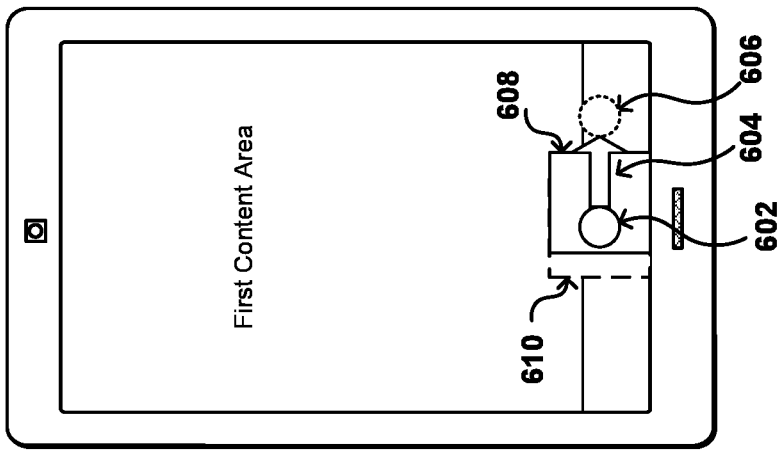

FIGS. 6A, 6B, and 6C illustrate an example 600 of navigating content using the gesture sensitive element, in accordance with various embodiments. The embodiment shown in FIGS. 6A-6C is similar to that described above with respect to FIGS. 5A-5C, but where a different gesture is utilized. As discussed above, a user can tap 602, drag 604, and hold 606 gesture sensitive element 608. The tap, drag, and hold gesture shown in this example is generally directed in the X direction, although similar gestures in different directions may correspond to different actions. When detected, the gesture sensitive element 608 can be shown to move 610 in the direction of gesture and hold its position. As shown in FIG. 6B, as the gesture sensitive element 608 is dragged and held to the right, it can be caused to display an icon 612 corresponding to an action associated with the gesture. In this example, a tap, drag, and hold gesture may be associated with a fast forward action. Similarly, a tap, drag, and hold gesture to the left may invoke a rewind action. In some embodiments, seek bar 614 or other icon indicating track position can be displayed in the second content area. Alternative visualizations may also be used in accordance with various embodiments. For example, seek bar 614 can be displayed as a part of the gesture sensitive element 608, such that it is displayed such that progress is indicated along the outline of the gesture sensitive element. When the user releases 616 the hold portion of the gesture, as shown in FIG. 6B, the gesture sensitive element 608 can return 618 to the original location as shown in FIG. 6C. In some embodiments, the action can begin upon determining that the hold gesture has been held for more than a threshold amount of time. The threshold may be set in one or more gesture definitions. Upon detection of release, the action can stop. For example, fast forwarding can begin when the hold portion of the gesture 606 has been detected for more than the threshold amount of time. The track position during the fast forward action can be displayed at 614. When the release 616 is detected, the fast forward action can be stopped and the track may continue playback at the new position.

Figure 7B:
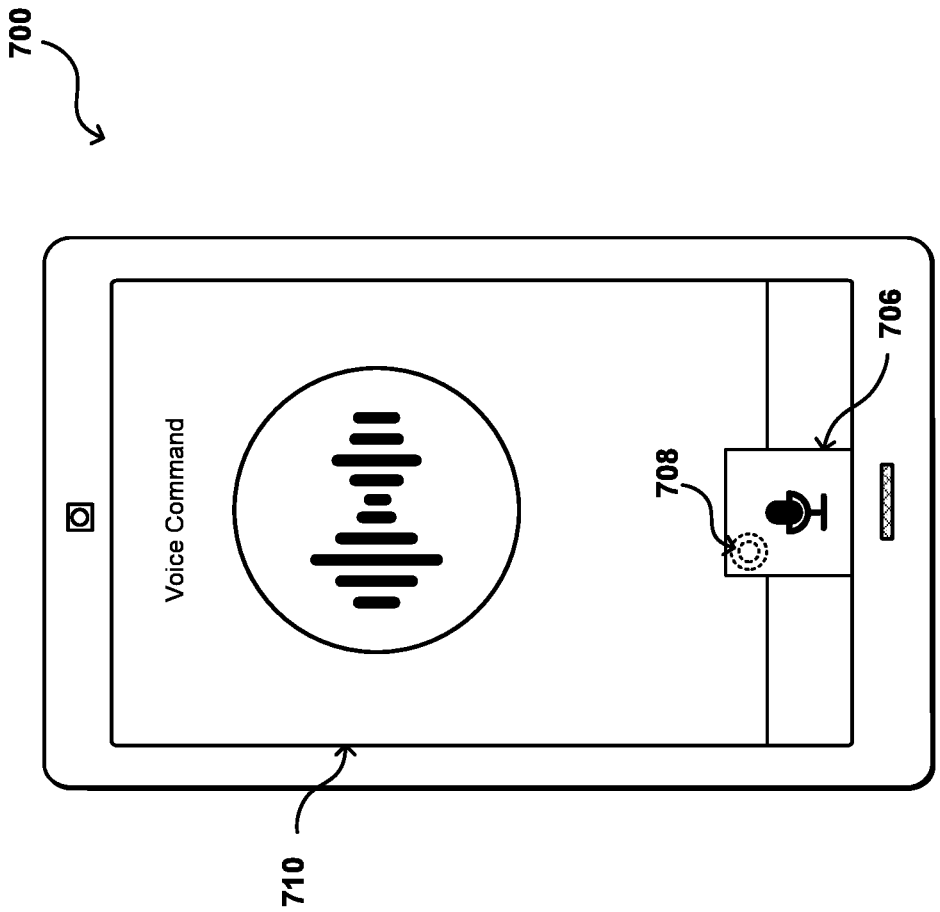
FIGS. 7A and 7B illustrate an example of invoking voice commands using the gesture sensitive element, in accordance with various embodiments.
Figure 7A:
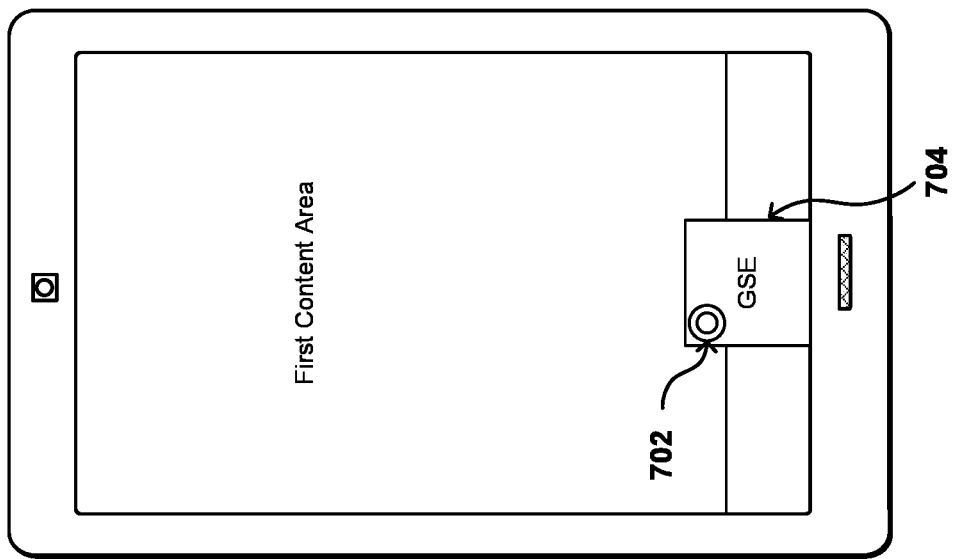

FIGS. 7A and 7B illustrate an example 700 of invoking voice commands using the gesture sensitive element, in accordance with various embodiments. As shown in FIG. 7A, a tap and hold gesture 702 may be used to activate additional actions. For example, if tap and hold gesture 702 is detected on gesture sensitive element 704 a voice command mode may be activated. In some embodiments, tap and hold gesture 702 may be detected upon determining the hold portion of the gesture has lasted for more than a threshold amount of time. The threshold can be defined in one or more gesture definitions. In some embodiments, a visualization of the threshold time may be displayed, for example a progress bar or other visualization indicating how long the hold has been held relative to the threshold. Once the hold has been detected for longer than the threshold time, the gesture sensitive element may display an icon corresponding to the new input mode. As shown in FIG. 7B, a microphone icon 706 is displayed. Once displayed, in some embodiments, the user can release 708 the hold portion and remain in voice command mode. Additionally, the first content area can be replaced with a voice command panel 710 which can indicate that the user device is ready to receive voice commands and provide visual feedback to the user.

Figure 8C:
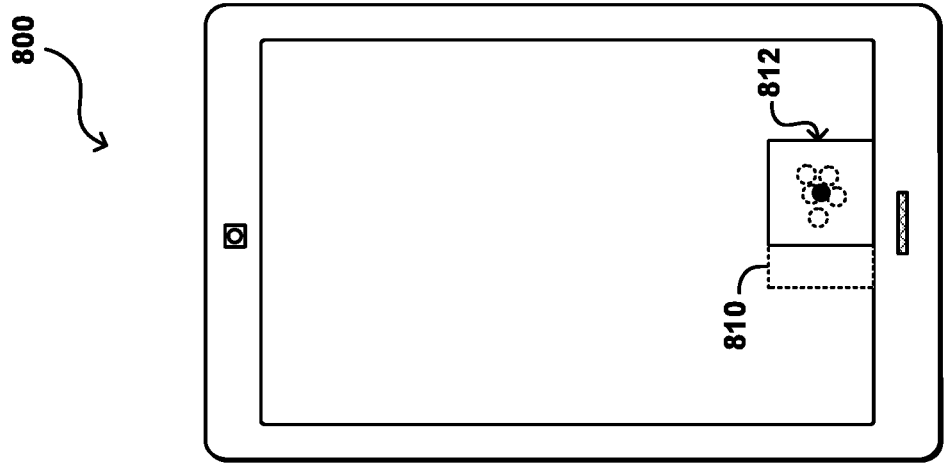
FIGS. 8A, 8B, and 8C illustrate an example of adjusting the position of the gesture sensitive element based on usage, in accordance with various embodiments.
Figure 8B:
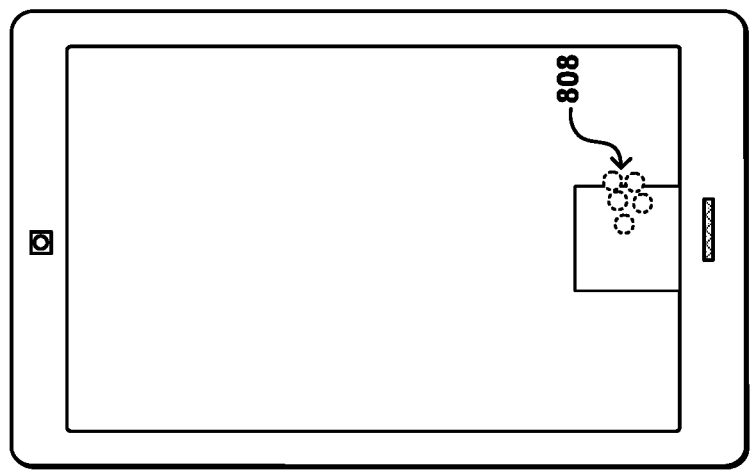
Figure 8A:
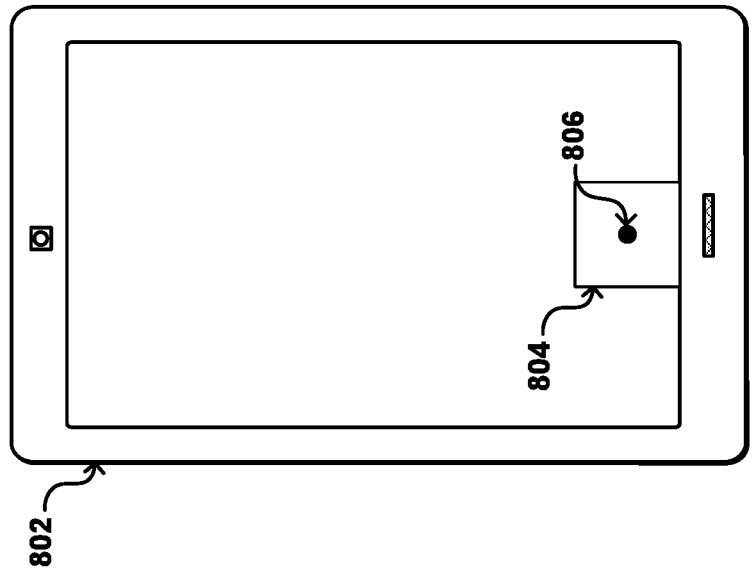

FIGS. 8A, 8B, and 8C illustrate an example 800 of adjusting the position of the gesture sensitive element based on usage, in accordance with various embodiments. As shown in FIG. 8A, various user devices 802 can display a GUI including a gesture sensitive element 804 in accordance with various embodiments. By default, the gesture sensitive element 804 may be placed such that its center point 806 is substantially centered along the bottom portion of the screen 808. Depending on the size of screen 808, and the size of the user's hands, this default position may not be comfortable for all users. For example, larger devices may typically be held with two hands, making the center of the screen more difficult to reach than the edges. Similarly, users with smaller hands may not comfortably reach the center of the screen

808. Accordingly, to accommodate different devices and different users, gesture sensitive element 804 can be configured to be automatically repositioned based on usage.

As shown in FIG. 8B, user device 802 can monitor screen locations of contacts made by a user over time. For example, various contacts 810 are shown, each generally to the right of center 806 of the gesture sensitive element 804. In some embodiments, user device 802 can calculate an average contact point corresponding to the user's contact history. The average contact point can be calculated on a periodic basis (e.g., hourly, daily, weekly, etc.) and/or based on usage (e.g., after every X number of contacts). If the average contact point is determined to be over a threshold distance from the center 806 of the gesture sensitive element, then an offset based on the distance between the average contact point and the center 806 can be determined. In some embodiments, the offset may be equal to a function of the distance. For example, the offset may be a fixed percentage of the distance or may be a nonlinear function of the distance, such that larger distances receive disproportionately larger offsets. The offset can then be used to shift the center 804 of the gesture sensitive element toward the average contact point. In some embodiments, the offset may be equal to the distance, moving the center point of the gesture sensitive element to the average contact point.

As shown in FIG. 8C, the gesture sensitive element 812 has been moved 814 such that the center of the gesture sensitive element is roughly equal to the average contact point. In various embodiments, user device 802 can continue monitoring contact positions to ensure gesture sensitive element 812 remains aligned with the user's average contact point. In some embodiments, different offsets may be similarly calculated when the device is held in landscape mode. Similarly, offsets may be calculated for each user of the device and applied when the user logs in. In some embodiments, when the position of the gesture sensitive element is moved, the move may be temporary (e.g., where a first user allows a second user to use the device). If the user device detects multiple changes in average contact points in a threshold period of time, the device may display a message asking the user whether the device should revert to a previously identified position. As such, an offset cache may maintain a history of offsets determined by the device, allowing users to revert to previously determined offsets without requiring the offset to be recalculated.

Figure 9:
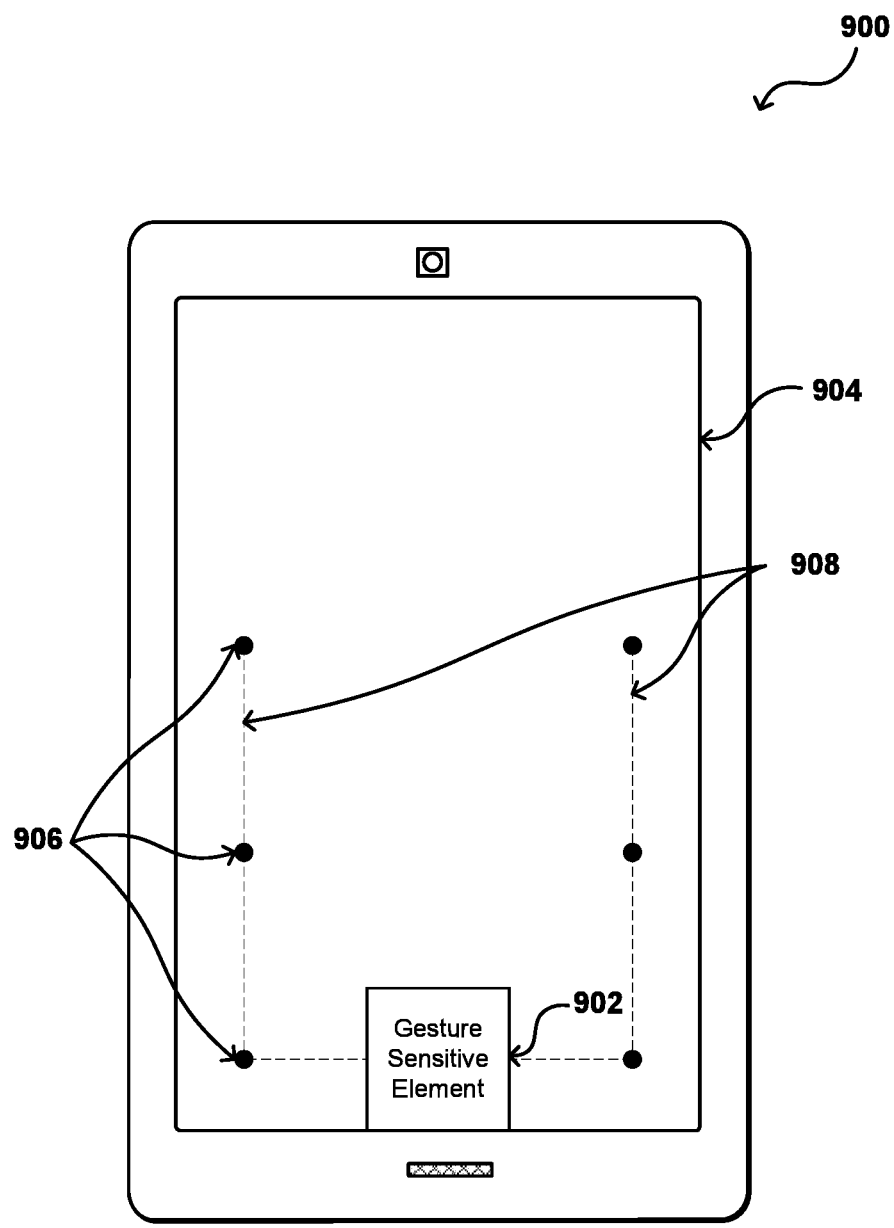
FIG. 9 illustrates an example of changing the position of the gesture sensitive element, in accordance with various embodiments.

FIG. 9 illustrates an example 900 of changing the position of the gesture sensitive element, in accordance with various embodiments. As shown in FIG. 9, in some embodiments, a gesture sensitive element 902 can be manually placed at one or more locations on the screen 904. In some embodiments, a user may select different positions for different applications and/or for different types of content being managed. For example, the user device may be generally used in a portrait orientation when managing audio content, but may generally be used in a landscape orientation when managing video content. Additionally, as discussed above, depending on the size of the device, different users may hold the device differently, meaning the default position may not be the most useful position for all users. Accordingly, a guide of snap points 906 and/or lines 908 may be displayed indicating locations where the gesture sensitive element 902 can be relocated. In some embodiments, a user may be limited to predefined locations 906 where the gesture sensitive element can be rendered, for example if other immovable GUI elements are present in a particular app. Alternatively, or additionally, continuous locations 908 can be defined over which the gesture sensitive element can be relocated.

In some embodiments, a relocation mode can be activated during which the guide(s) 906, 908 are displayed. Once the user chooses one or more new locations for the gesture sensitive element, the locations can be stored in preference data associated with the user. Subsequently, when the user opens an app that includes gesture sensitive element 902, the element can be positioned based on the user's preference data. As discussed, different locations may be defined for different apps and may be maintained in the user's preference data.

Figure 10:
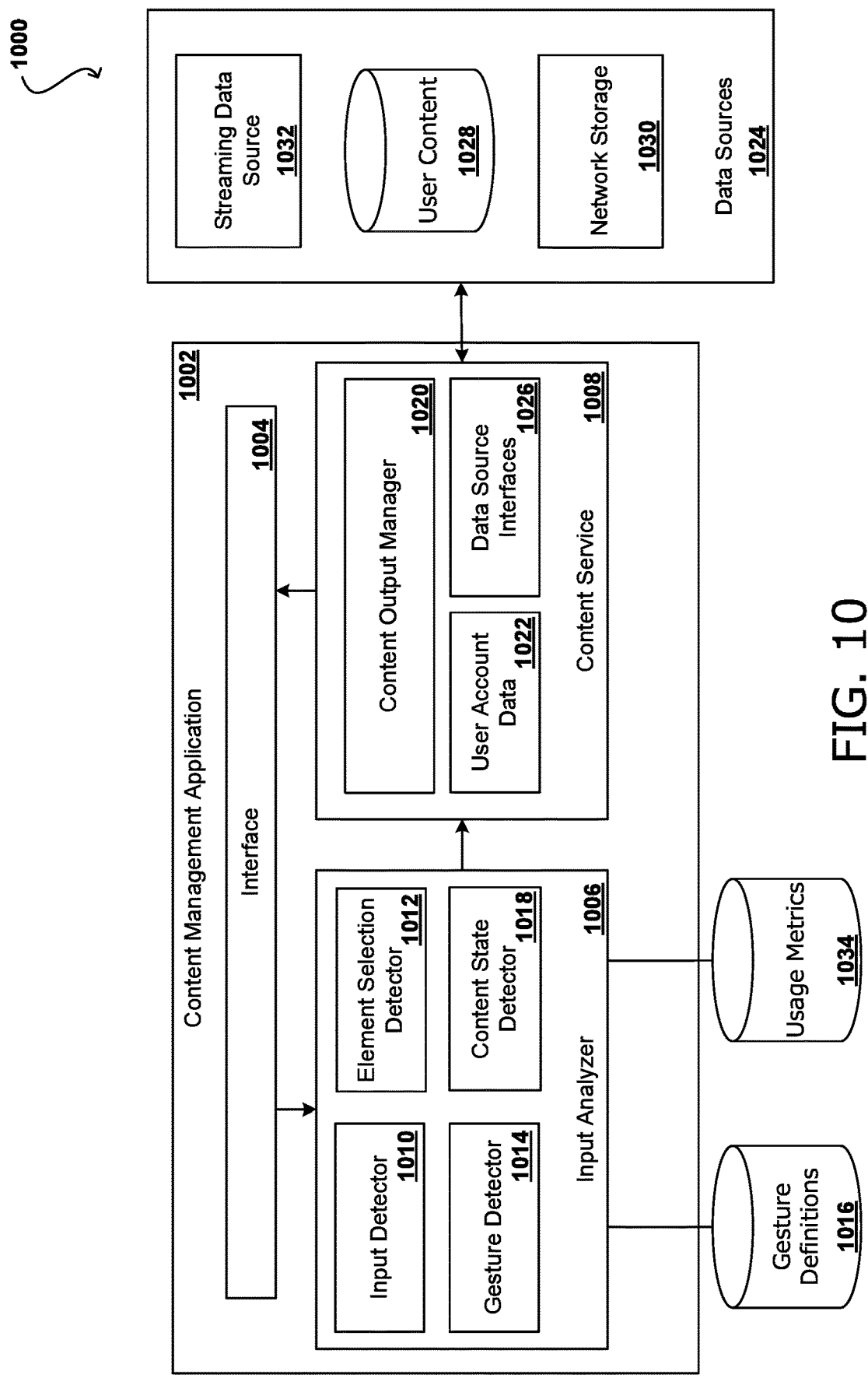
FIG. 10 illustrates an example content management system, in accordance with various embodiments.

FIG. 10 illustrates an example content management system 1000, in accordance with various embodiments. As shown in FIG. 10, a user device can include a content management application 1002. Content management application 1002 can execute on a user device including a touchscreen or other interface that enables users to provide gesture based inputs through a graphical user interface (GUI). In various embodiments, content management application 1002 can receive input data received by the touchscreen through interface 1004. Similarly, content management application can update the GUI based on the input data and corresponding actions performed, through interface 1004. Content management application 1002 can include an input analyzer configured to determine at least one action corresponding to a received input, and a content service 1008 configured to perform the identified action. Although the embodiment shown in FIG. 10 shows both the input analyzer 1006 and the content service 1008 as part of content management application 1002 executing on a client device, in various embodiments the functionality of content service 1008 may be executed remotely at a server. In such embodiments, the actions identified by input analyzer 1006 may be communicated over a network to content service 1008. Alternative configurations may also be implemented as would be understood by one of ordinary skill in the art. The embodiments described herein are intended to be illustrative and not intended to be limiting.

As shown in FIG. 10, input analyzer 1006 can include a input detector 1010, element selection detector 1012, and gesture detector 1014. As discussed, gesture based inputs can be received through a touchscreen and analyzed to determine actions associated therewith. In some embodiments, input detector 1010 can determine that an input is received and track screen locations associated with the input. For example, input detector 1010 can detect a tap and drag gesture as at least two portions, including an initial contact point (e.g., the tap) and a moving contact point (e.g., the drag). When an input is detected by input detector 1010, element selection detector 1012 can determine whether the input is associated with a selectable GUI element. For example, as discussed, the GUI may include various control elements as well as content items and other elements that may be associated with fixed actions (e.g., play, pause, stop, etc.) that are executed when the element is selected via interactions with the GUI through a touchscreen. Additionally, as discussed above, some elements may be gesture sensitive such that various actions may be performed depending on the received gesture. In some embodiments, element selection detector 1012 can compare one or more screen locations associated with the input, received from input detector 1010, to one or more screen locations associated with a gesture sensitive element. As discussed, in some embodiments, a gesture sensitive element may be associated with an area of the screen. If the one or more locations associated with the input are located within the area of the screen associated with the gesture sensitive element, then the element selection detector can determine that the gesture sensitive element has been selected.

If element selection detector 1012 determines that a gesture sensitive element is selected, gesture detector 1014 can analyze the input data to identify a corresponding action to the gesture. In some embodiments, a gesture sensitive element may be associated with one or more gestures which each correspond to one or more actions. Gestures and corresponding actions can be maintained in one or more gesture definitions 1016 which are associated with the gesture sensitive element. In some embodiments, gesture detector 1014 can analyze the input to determine a direction associated with the gesture. In some embodiments, gesture detector 1014 can determine a distance associated with the gesture (e.g., a length of a drag or swipe) and/or a time associated with the gesture (e.g., how long a hold gesture has been held). In some embodiments, gesture actions may vary depending on content state. For example, in a music app, a gesture may correspond to one action if a track is currently playing, and may correspond to a different action (or no action) if no track is playing. Similarly, a gesture may correspond to one action in a music management app, but may correspond to a different action in an image management app. Accordingly, in some embodiments, a content state detector 1018 can determine a current state of the content management application. Content state detector may include a plurality of content states (e.g., idle, track playing, etc.) which can be matched to the current state of the content management application. In some embodiments, content management application 1002 can update content state detector as the state changes in the application. When a gesture is detected that is associated with different actions based on content state, the content state from content state detector 1018 can be used to determine the appropriate action.

Once an action has been determined by input analyzer 1006, the content service 1008 can be instructed to perform the identified action. Content output manager 1020 can perform the action received from input analyzer 1006. For example, if the action is related to a current content item (e.g., fast forward or rewind a music content item), then content output manager 1020 can manage the content item accordingly. If the action is related to a new content item (e.g., request to play a new track, select a new album, etc.) then content output manager can determine whether the user is authorized to perform the action using user account data 1022. For example, the requested content item may not be accessible to the user or may require additional information from the user to become accessible. If it is determined that the content item is accessible to the user, content output manager can retrieve the content item from one or more data sources 1024 through one or more data source interfaces 1026. For example, content items may be stored locally in a user content store 1028, a networked storage system 1030, a streaming data source 1032, or other data source. Once the content item is retrieved, content output manager 1020 can cause the content item to be output to the user through interface 1004. For example, the content output manager 1020 can cause a music content item to be played by the user device and corresponding information related to the content item to be displayed, as described above.

In some embodiments, as described above, user account data can also include user preferences, such as position preferences or offset data related to the position of a gesture sensitive element in the GUI. Content output manager 1020 can determine such position preferences from user account data 1022 and cause the gesture sensitive element to be displayed according to the user preferences.

In some embodiments, input analyzer 1006 can collect usage metrics as inputs are received and store the usage metrics in data store 1034. In some embodiments, usage metrics 1034 can be maintained to assist in troubleshooting and other maintenance processes. In some embodiments, usage metrics 1034 can be sent to a server for further analysis. For example, analysis of usage metrics 1034 may indicate that users are typically using a control element to execute a particular action rather than a gesture based input. In such an example, a reminder message may be displayed in the GUI the next time a user selects the control element, reminding the user of available gesture based inputs.

Figure 11:
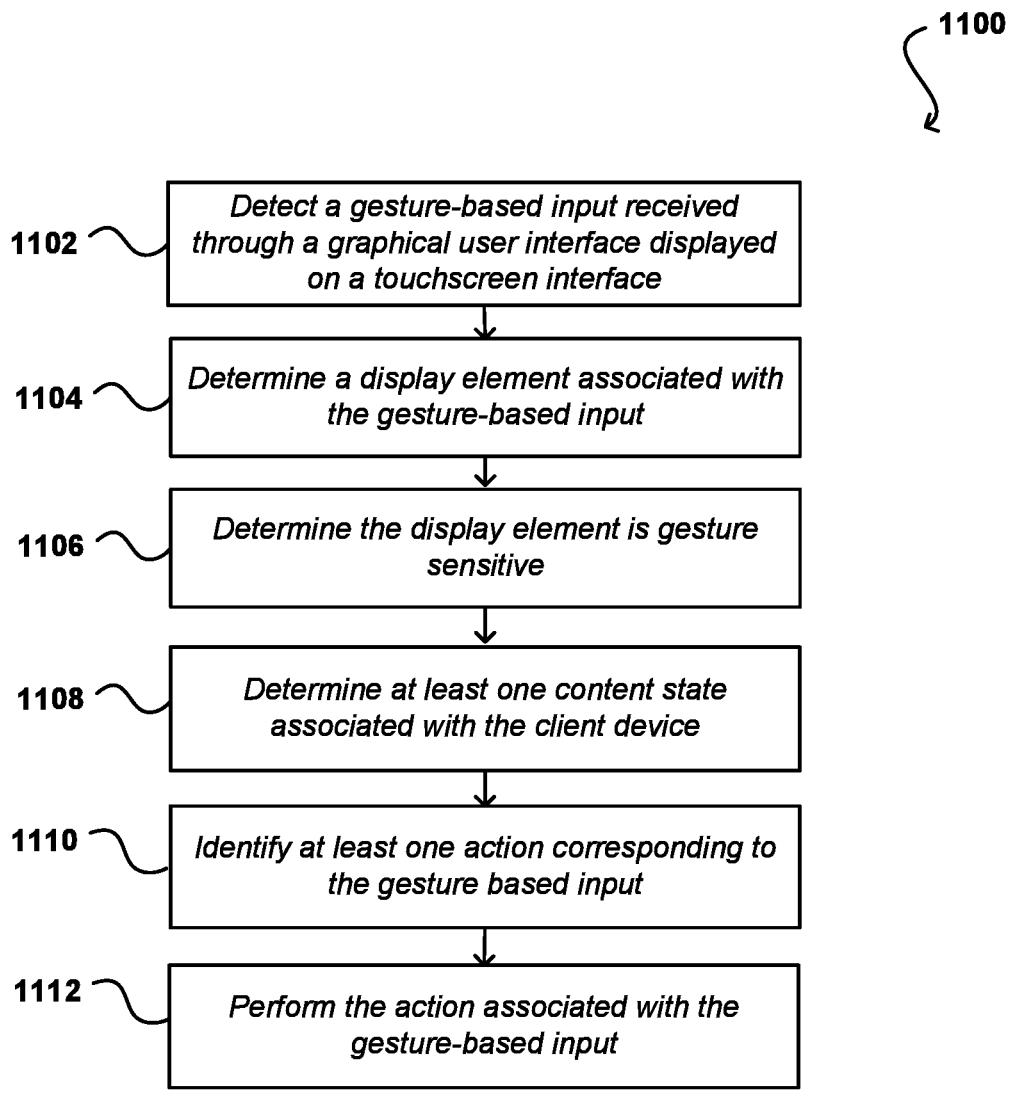
FIG. 11 illustrates an example process of navigating a graphical user interface using a gesture sensitive element, in accordance with various embodiments.

FIG. 11 illustrates an example process 1100 of navigating a graphical user interface using a gesture sensitive element, in accordance with various embodiments. As shown in FIG. 11, a gesture based input received through a graphical user interface (GUI) displayed on the touchscreen interface can be detected 1102. In various embodiments, the GUI can include a plurality of control elements, the plurality of control elements including at least one gesture sensitive element. The GUI can be associated with a media player application, such as a music player, video player, or other content management application.

A display element associated with the gesture based input can be determined 1104. In some embodiments, the selected display element associated with the gesture can be determined based at least on a screen location associated with the gesture based input. In various embodiments, it can be determined 1106 that the display element is a gesture sensitive element. As discussed, a gesture sensitive element may be associated with multiple actions that can be invoked depending on which gesture is used with the gesture sensitive element.

In some embodiments, at least one content state associated with the computing device may be determined 1108. As discussed, a gesture may be associated with different actions depending on, e.g., whether a content item is currently being played, displayed, or otherwise active in the GUI. In some embodiments, the content item can include at least one of an album, a playlist, a music file, or a streaming music source. An action corresponding to the gesture based input can be identified 1110. As discussed, a gesture sensitive element can be associated with various gesture definitions, each gesture definition defining one or more actions to be performed when a gesture is detected over the gesture sensitive element. For example, as discussed the gesture sensitive input may be associated with a gesture (e.g., a tap, drag, hold, or other gesture) that causes an expansion action, as described above with respect to FIGS. 3A and 3B. The corresponding action may then be performed 1112. For example, the gesture sensitive element can be expanded to show a second set of control elements. One or more of these control elements may be selected to then perform another action associated with the current content item. In some embodiments, performing the action can include displaying a graphical icon associated with the action over the gesture sensitive element.

In some embodiments, as discussed above, usage metrics associated with the gesture sensitive element and the plurality of control elements can be collected. The usage metrics may indicate how frequently different elements are used to perform various actions. The usage metrics can be sent to a server associated with the media management application.

Figure 12:
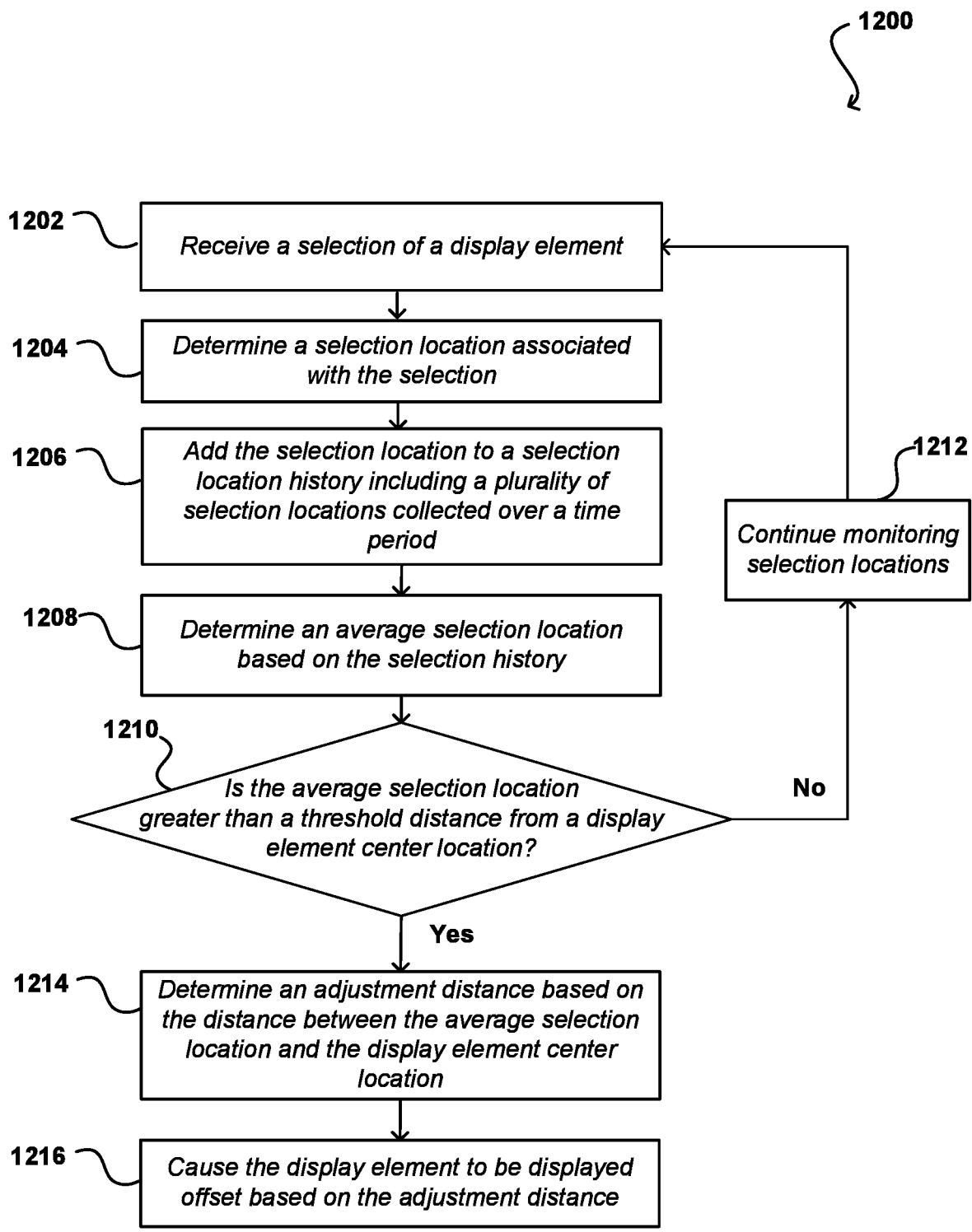
FIG. 12 illustrates an example process of adjusting the position of the gesture sensitive element based on usage, in accordance with various embodiments.

FIG. 12 illustrates an example process 1200 of adjusting the position of the gesture sensitive element based on usage, in accordance with various embodiments. As shown in FIG. 12, a selection of a display element can be received 1202. The selection can be made through a graphical user interface via a touchscreen interface. In various embodiments, the selection may be made as part of a gesture based input (e.g., as the start point or end point of the gesture based input). A selection location associated with the selection can be determined 1204. The selection location may correspond to coordinates on the touchscreen and may be represented in pixels or any other units. Once the selection location has been determined, it can be added 1206 to a selection history which includes a plurality of selection locations collected over a time period.

Based on the selection history, an average selection location can be determined 1208. For example, a mean x value and y value may be calculated by averaging each selection location in the selection history. In some embodiments, a subset of the selection history (e.g., a specified number of recent selections) may be used to calculate the average selection location. It can then be determined 1210 if the average selection location greater than a threshold distance from a center point of the display element. If not, then selection locations can continue to be monitored 1212 and stored in the selection history.

If the average selection location is greater than the threshold, then an adjustment distance can be determined 1214 based on the distance between the average selection location and the display element center location. As discussed above, the adjustment distance can be equal to the distance between the average selection location and the center point of the display element. In various embodiments, the adjustment distance may be a linear or nonlinear function of the distance between the average selection location and the center point of the display element. Using the adjustment distance, subsequent renderings of the GUI can cause the display element to be displayed 1216 offset based on the adjustment distance. In some embodiments, adjustment distance may be limited to the difference in x-values between the center location and the average selection location. As discussed above, each selection location can correspond to a contact point the user makes with the touchscreen interface.

As discussed above, in some embodiments, a user may manually select a location on the screen to display the gesture sensitive element. For example, a request to adjust a position of the gesture sensitive element may be received. A relocation overlay, such as described above with respect to FIG. 9, may then be displayed. The relocation overlay may include one or more locations to which the gesture sensitive element can be repositioned and/or may include continuous areas, regions, lines, or other locations in which the gesture sensitive element may be repositioned. The user may then select a location within the overlay. In some embodiments, the gesture sensitive element may be displayed at the new position before the relocation is complete, enabling the user to use the gesture sensitive element and further reposition as needed. Once complete, the relocation overlay can be hidden and the gesture sensitive element can be shown at the new location. In some embodiments, as discussed above, the selected location may be associated with a user account such that the gesture sensitive element is displayed at the selected location for that user going forward. In some embodiments, the location can be synced across multiple devices shared by that user.

Figure 13:
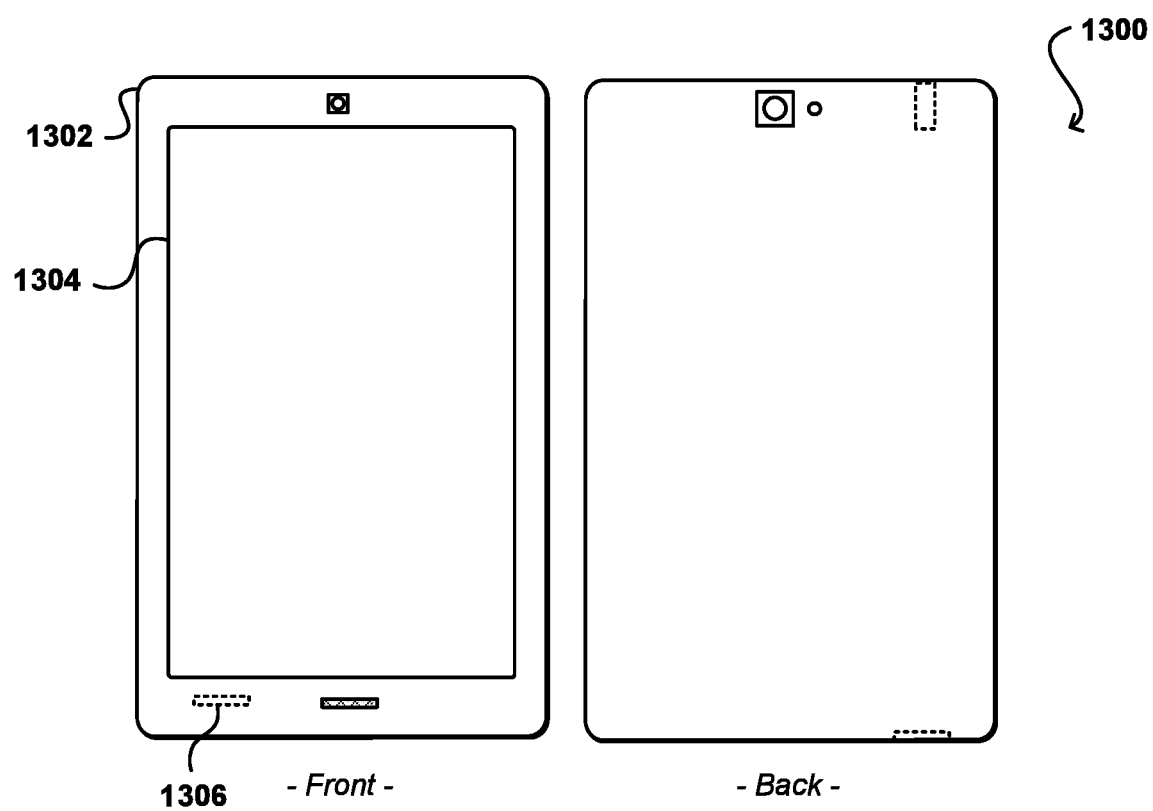
FIG. 13 illustrates an example device that can be used to implement aspects of the various embodiments.

FIG. 13 illustrates an example electronic user device 1300 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, wearable devices (e.g., smart watches, fitness trackers, or other wearable devices), virtual and/or augmented reality systems (e.g., headsets, smart glasses, and other devices), personal data assistants, smart phones, video gaming consoles, television set top boxes, and portable media players. In this example, the computing device 1302 has a display screen 1304 on the front side, which under normal operation will display information to a user facing the display screen (e.g., on the same side of the computing device as the display screen). It should be understood that computing devices such as servers, however, may not have dedicated display elements. The example computing device 1300 also includes at least one networking component 1306, such as a network interface card, wireless networking component, and the like, enabling the computing device to communicate information over at least one network.

Figure 14:
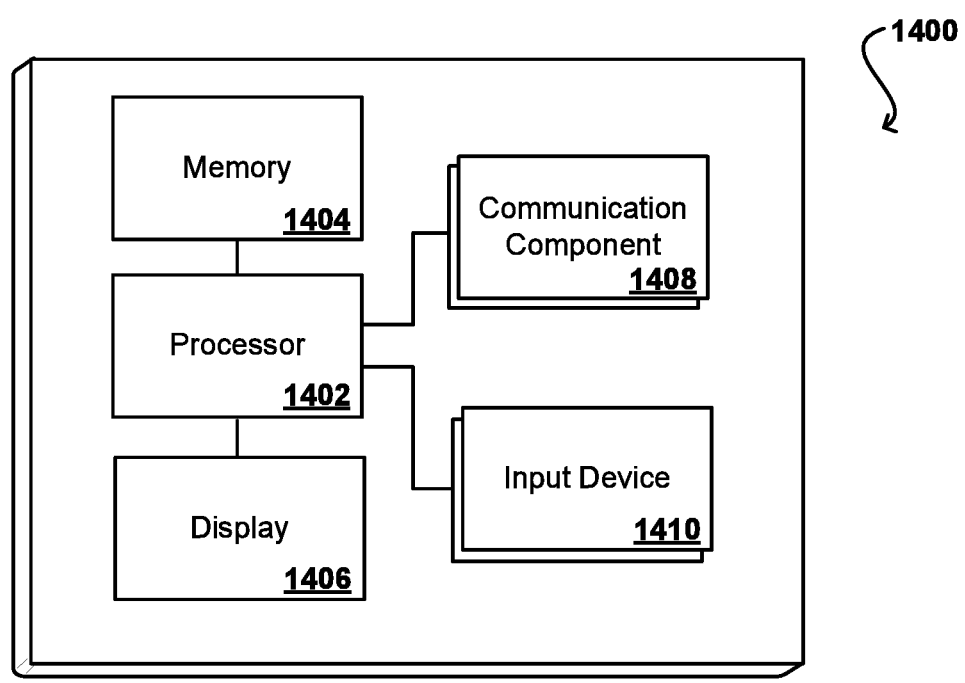
FIG. 14 illustrates example components of a client device such as that illustrated in FIG. 13.

FIG. 14 illustrates a logical arrangement of a set of general components of an example computing device 1400 such as the device 1300 described with respect to FIG. 13. In this example, the device includes a processor 1402 for executing instructions that can be stored in a memory device or element 1404. As would be apparent to one of ordinary skill in the art, the device can include many types of memory, data storage, or non-transitory computer-readable storage media, such as a first data storage for program instructions for execution by the processor 1402, a separate storage for images or data, a removable memory for sharing information with other devices, etc. The device typically will include some type of display element 1406, such as a touch screen or liquid crystal display (LCD), although devices such as portable media players might convey information via other means, such as through audio speakers. In some embodiments, the computing device 1400 of FIG. 14 can include one or more networking and/or communication elements 1408, such as a Wi-Fi, Bluetooth, RF, wired, or wireless communication system. The device in many embodiments can communicate with a network, such as the Internet, and may be able to communicate with other such devices. In some embodiments the device can include at least one additional input component 1410 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

Figure 15:
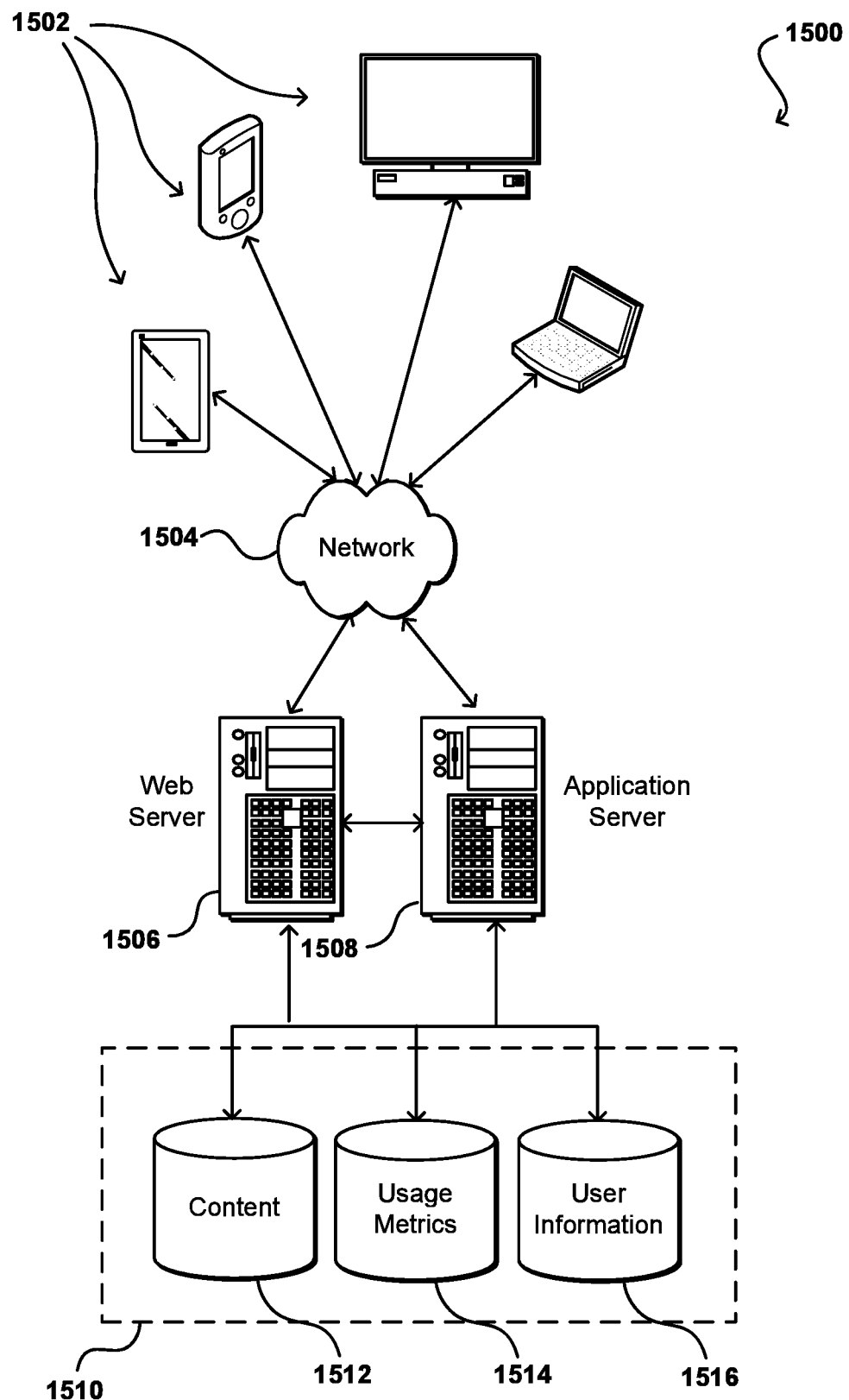
FIG. 15 illustrates an environment in which various embodiments can be implemented in accordance with various embodiments.

As discussed, different approaches can be implemented in various environments in accordance with the described embodiments. For example, FIG. 15 illustrates an example of an environment 1500 for implementing aspects in accordance with various embodiments. As will be appreciated, although a Web-based environment is used for purposes of explanation, different environments may be used, as appropriate, to implement various embodiments. The system includes an electronic client device 1502, which can include any appropriate device operable to send and receive requests, messages or information over an appropriate network 1504 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Computing over the network can be enabled via wired or wireless connections and combinations thereof. In this example, the network includes the Internet, as the environment includes a Web server 1506 for receiving requests and serving content in response thereto, although for other networks, an alternative device serving a similar purpose could be used, as would be apparent to one of ordinary skill in the art.

The illustrative environment includes at least one application server 1508 and a data store 1510. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1508 can include any appropriate hardware and software for integrating with the data store 1510 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1506 in the form of HTML, XML or another appropriate structured language in this example. The handling of all requests and responses, as well as the delivery of content between the client device 1502 and the application server 1508, can be handled by the Web server 1506. It should be understood that the Web and application servers are not required and are merely example components, as structured code discussed herein can be executed on any appropriate device or host machine as discussed elsewhere herein.

The data store 1510 can include several separate data tables, databases or other data storage mechanisms and media for storing data relating to a particular aspect. For example, the data store illustrated includes mechanisms for storing content (e.g., production data) 1512 and user information 1516, which can be used to serve content for the production side. The data store is also shown to include usage metrics 1514. It should be understood that there can be many other aspects that may need to be stored in the data store, such as page image information and access rights information, which can be stored in any of the above listed mechanisms as appropriate or in additional mechanisms in the data store 1510. The data store 1510 is operable, through logic associated therewith, to receive instructions from the application server 1508 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1502. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via computing links, using one or more computer networks or direct connections. However, it will be appreciated by those of ordinary skill in the art that such a system could operate equally well in a system having fewer or a greater number of components than are illustrated in FIG. 15. Thus, the depiction of the system 1500 in FIG. 15 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate storage media used in the art, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method, comprising:
   providing a graphical user interface (GUI) including a first plurality of control elements, the first plurality of control elements including at least one gesture sensitive element, the GUI associated with an audioplayer application;
   providing content comprising a media stream associated with the audioplayer application;
   displaying a content area associated with the audioplayer application;
   receiving a gesture based input through the GUI via a touchscreen interface;
   determining a selected control element associated with the gesture based input based at least on a screen location associated with the gesture based input;
   automatically repositioning the screen location associated with the gesture based input, based at least in part on a distance between an average contact point and a center point of the selected control element associated with the gesture based input;
   determining that the selected control element is the at least one gesture sensitive element;
   determining the gesture based input is associated with an expansion action;
   displaying, in a control area covering a portion of the content area that is less than the entire content area, an expanded gesture sensitive element including a second plurality of control elements for actions available to the content in a content state within the audioplayer application;
   receiving a selection of a control element from the second plurality of control elements;
   determining an action corresponding to the control element from the second plurality of control elements; and
   performing the action corresponding to the control element from the second plurality of control elements on a content item.

2. The method of claim 1, further comprising:
   displaying a graphical icon associated with the action over the at least one gesture sensitive element.

3. The method of claim 1, wherein the content item is at least one of an album, a playlist, a music file, or a streaming music source.

4. The method of claim 1, further comprising:
   determining a contact point associated with the gesture based input;

adding the contact point to a selection location history including a plurality of contact points collected over a period of time;
determining the average contact point based on the selection location history;
determining a distance between the average contact point and the center point of the gesture sensitive element;
determining an adjustment distance based on the distance between the average contact point and the center point of the gesture sensitive element; and
displaying the gesture sensitive element offset by the adjustment distance.

5. A computing device, comprising:
a touchscreen interface;
a computing device processor; and
a memory device including instructions that, when executed by the computing device processor, cause the computing device to:
detect a gesture based input received through a graphical user interface (GUI) displaying a content area on the touchscreen interface;
reposition a contact point of a display element associated with the gesture based input, based at least in part on a distance between an average contact point and a center of the contact point;
determine that the display element is a gesture sensitive element;
determine at least one content state associated with content comprising a media stream in an application on the computing device;
identify actions for the content of the at least one content state within the application, the actions corresponding to the gesture based input and the gesture sensitive element;
display, in a control area covering a portion of the content area that is less than the entire content area, control elements associated with the actions; and
perform an action, from the actions, corresponding to a selection from the control elements.

6. The computing device of claim 5, wherein the GUI includes a plurality of display elements, the plurality of display elements including the gesture sensitive element and a plurality of control elements.

7. The computing device of claim 6, wherein the GUI is associated with a media player application configured to play at least one content item.

8. The computing device of claim 7, wherein the instructions, when executed further enable the computing device to:
collect usage metrics associated with the gesture sensitive element and the plurality of control elements; and
send the usage metrics to a server associated with the media management application.

9. The computing device of claim 5, wherein the instructions, when executed, further enable the computing device to:
determine the contact point associated with the gesture based input;
add the contact point to a selection location history including a plurality of contact points collected over a period of time;
determine the average contact point based on the selection location history;
determine the distance between the average contact point and the center of the contact point;
determine an adjustment distance based on the distance between the average contact point and the center of the contact point; and
display the gesture sensitive element offset by the adjustment distance.

10. The computing device of claim 5, wherein the instructions, when executed, further enable the computing device to:
receive a request to adjust a position of the gesture sensitive element;
display a relocation overlay;
receive a selection of a location in the relocation overlay;
hide the relocation overlay; and
cause the gesture sensitive element to be displayed at a location that is associated with the position.

11. The computing device of claim 5, wherein the action is performed to a content item that is at least one of an album, a playlist, a music file, or a streaming music source.

12. The computing device of claim 5, wherein the instructions, when executed, further enable the computing device to:
display a graphical icon associated with the action over the gesture sensitive element.

13. A method, comprising:
detecting a gesture based input received through a graphical user interface (GUI) displaying a content area on a touchscreen interface;
repositioning a contact point of a display element associated with the gesture based input, based at least in part on a distance between an average contact point and a center of the contact point;
determining that the display element is a gesture sensitive element;
determining at least one content state associated with content comprising a media stream in an application on a computing device;
identifying actions for the content of the at least one content state within the application, the actions corresponding to the gesture based input and the gesture sensitive element;
displaying, in a control area covering a portion of the content area that is less than the entire content area, control elements associated with the actions; and
performing an action, from the actions, corresponding to a selection from the control elements.

14. The method of claim 13, wherein the GUI includes a plurality of display elements, the plurality of display elements including the gesture sensitive element and a plurality of control elements.

15. The method of claim 14, wherein the GUI is associated with a media player application configured to play at least one content item.

16. The method of claim 15, further comprising: collecting usage metrics associated with the gesture sensitive element and the plurality of control elements; and sending the usage metrics to a server associated with the media management application.

17. The method of claim 14, further comprising:
displaying a graphical icon associated with the action over the gesture sensitive element.

18. The method of claim 14, further comprising:
determining the contact point associated with the gesture based input;
adding the contact point to a selection location history including a plurality of contact points collected over a period of time;

determining an average contact point based on the selection location history;

determining the distance between the average contact point and the center point of the contact point;

determining an adjustment distance based on the distance between the average contact point and the center point of the contact point; and displaying the gesture sensitive element offset by the adjustment distance.

19. The method of claim 14, further comprising:

receiving a request to adjust a position of the gesture sensitive element;

displaying a relocation overlay;

receiving a selection of a location in the relocation overlay;

hiding the relocation overlay; and causing the gesture sensitive element to be displayed at a location that is associated with the position.

20. The method of claim 14, wherein the action is performed to a content item that is at least one of an album, a playlist, a music file, or a streaming music source.

* * * * *